United States Patent

Robertson et al.

[15] 3,693,252

[45] Sept. 26, 1972

[54] METHOD OF PROVIDING ENVIRONMENTAL PROTECTION FOR ELECTRICAL CIRCUIT ASSEMBLIES

[72] Inventors: Mark Christian Robertson, Grafton; Donald Lloyd Bishop, Shorewood, both of Wis.

[73] Assignee: Globe-Union Inc., Milwaukee, Wis.

[22] Filed: Aug. 21, 1969

[21] Appl. No.: 862,582

[52] U.S. Cl. ........................29/627, 29/588, 264/272

[51] Int. Cl. ........................H05k 3/28

[58] Field of Search ................29/627, 588; 264/272; 317/101 R, 101 A, 101 CP; 117/62.2, 218, 212, 232

[56] References Cited

UNITED STATES PATENTS

| | | | |
|---|---|---|---|
| 3,469,148 | 9/1969 | Lund | 29/627 X |
| 3,429,981 | 2/1969 | Shallahamer et al. | 29/627 X |
| 3,404,319 | 10/1968 | Tsuji et al. | 317/101 A |
| 2,943,359 | 7/1960 | Sussman | 264/272 X |
| 3,501,832 | 3/1970 | Saburo Iwata et al. | 29/626 |
| 3,374,536 | 3/1968 | Schroeder et al | 29/613 |
| 3,138,771 | 6/1964 | Goldsmith et al. | 29/605 |

OTHER PUBLICATIONS

Organic Coatings, Licari and Brands, Machine Design, May 25, 1967, Pages 178– 179

*Primary Examiner*—John F. Campbell
*Assistant Examiner*—Dale M. Heist
*Attorney*—John Phillip Ryan, Glenn A. Buse, Donald D. Denton and David T. Terry

[57] ABSTRACT

The application of environmental protection for discrete electrical components mounted on a circuit substrate is precisely controlled by first forming a thermosetting material, such as a bisphenol epoxy resin, into a body having a cavity sufficient to accommodate the electrical component, preferably by mechanical compaction of the material in powder form, placing the preformed body in the inverted position over the circuit element, and then heating the assembly to cure the thermosetting material to at least a semi-hardened state. In one embodiment, a second thermosetting material, having a coefficient of thermal expansion closely approximating that used for the preformed body in order to minimize internal stresses during thermal cycling of the completed assembly, is used as a protective overcoating.

11 Claims, 5 Drawing Figures

INVENTORS
M. C. ROBERTSON
D. L. BISHOP

By Glenn A. Buse
ATTORNEY

METHOD OF PROVIDING ENVIRONMENTAL PROTECTION FOR ELECTRICAL CIRCUIT ASSEMBLIES

BACKGROUND OF THE INVENTION

1. Field of the invention

This invention relates to packaging of electrical circuit assemblies. In one aspect, this invention relates to a method, and the article produced thereby, wherein environmental protection is provided to discrete electrical components of a hybrid miniaturized electrical circuit assembly.

2. Description of the Prior Art

During the typical manufacture of modular electrical circuit assemblies, one of the first steps of assembly is the mounting of discrete components, such as diodes, transistors, chip capacitors, or integrated circuit units, onto a circuit substrate. These components are then electrically connected to other circuit elements by fine wires, usually gold wires having a diameter in the order of 1 mil. Semiconductor devices and wires are extremely vulnerable to environmental conditions such as fungi, dirt, moisture, noxious fumes, etc. and the chemical and mechanical treatment involved in subsequent handling and/or assembly steps, such as the soldering of external electrical leads to the circuit substrate. Therefore, some type of protection must be provided to isolate the components and wires from the deleterious effects of subsequent processing and/or environmental conditions without influencing the electrical properties thereof. Generally, the finished product must be coated with a material that will withstand relatively adverse chemical environments, yet be esthetically pleasing. It must also withstand specified conditions of vibration, shock and acceleration. All these factors must be accomplished within certain economic constraints so that the assembly may be marketed at a relatively low cost.

For applications where a high degree of hermeticity is not required, this protection is typically provided by encapsulating the semiconductor devices and wires with a thermosetting organic resin. This resin, such as a silicon or epoxy resin, is usually applied in liquid form by a syringe-type applicator. In some applications this resin, when cured to a hardened state, is the only environmental protection provided. In other applications, the resin is at least partially cured to provide an interim protection during subsequent processing steps and, after the external leads are attached, the entire circuit substrate is encapsulated with an overcoating of another organic resin, such as a phenolic or epoxy resin, to provide the environmental protection. This overcoating is usually applied, either in liquid or powdered form, by dipping, spraying or brushing and then cured to a solid, infusible state by heating.

These prior art techniques have several disadvantages. In addition to the difficulty of dispensing a precise quantity of liquid resin rapidly and accurately, it is extremely difficult to control the area of application. For instance, any change in the viscosity of the liquid resin resulting from variations in composition, temperature, etc., produces variations in the thickness of the protective coating and the surface area of the circuit substrate covered as the liquid is flowed thereon. Consequently, an operator is constantly plagued with the problem of insuring that a sufficient quantity of the liquid resin is applied to provide the desired environmental protection without it flowing over unwanted areas, such as conductive paths to which electrical leads are to be dip soldered in a subsequent assembly step. The present trend towards miniaturization with intricate circuit designs makes the precise control of the area of application even more crucial.

Because of the different modes of application used in the prior art techniques, the material utilized to provide the interim protection usually is not the same as that used as the final encapsulant. A difference in the coefficients of thermal expansion of the two materials frequently results in internal stresses and cracking, with consequent loss of moisture protection, when the finished assembly is subjected to thermal cycling.

SUMMARY OF THE INVENTION

The primary object of this invention is to provide a simplified, inexpensive method for producing an improved environmental protection for electrical circuit assemblies.

Another object of this invention is to provide an improved method and electrical circuit assembly wherein the quantity and the area of application of the environmental protection for discrete components can be controlled precisely.

A further object of this invention is to provide such a method and electrical circuit assembly wherein internal stresses within the environmental protective coatings, resulting from thermal cycling, are minimized.

Other objects and advantages of this invention will be apparent to those skilled in the art from the following description, drawing and appended claims.

According to this invention an organic thermosetting material is first formed into a body having a cavity sufficient to accommodate the electrical component to be protected. The body, preferably cup-shaped, is then placed onto the surface of the circuit substrate, in the inverted position, over the electrical component and associated connecting wires which are to be environmentally protected. Preferably, the substrate is preheated to the temperature above which the particular thermosetting material used becomes tacky. The assembly is then heated to at least partially cure the thermosetting material. For those applications where the environmental protection provided by this initial application of material is sufficient without an additional overcoating, the thermosetting material is completely cured into a hardened state in this step. For other applications where this initial application of thermosetting material is used as an interim protection, the preformed thermosetting material is preferably only partially cured in this step, although it can be completely cured if desired. After the preformed material has been at least partially cured and the completion of further assembly steps, such as soldering on external leads, an outer protective coating of an organic thermosetting material, preferably the same material as that used for the preformed cup, is applied over the surface of the assembly and the entire assembly is heated to cure both the overcoating and the preformed body to a solid state to provide a final protective coating.

The organic thermosetting materials usable in this invention for forming the body and the overcoating are generally those which require some type of curing or hardening and are distinguished from thermoplastic materials in that once the thermosetting materials have taken shape in a cured state, they cannot be formed by melting and reforming. These materials preferably have a decomposition point which is reasonably higher than its melting point (prior to curing or setting), and a melting point which is lower than a temperature which would be deleterious to the semiconductor devices being protected. Representative examples of such materials include phenol-formaldehyde resins, urea-formaldehyde resins, alkyd resins, the melamine-formaldehyde resins, the unsaturated polyesters, the silicon resins, the epoxy resins, the polyester resins and mixtures thereof, with semi-cured or "B-stage" bisphenol epoxy resins which readily become fluid under heat and low pressure being preferred.

The terms "organic thermosetting materials" as used herein is not restricted to resins but is intended to include any material having similar characteristics. The curing of materials of this type take place under a variety of conditions and through a number of mechanisms well-known in the art. As is well recognized in the art, these organic thermosetting materials can include various fillers and pigments to obtain certain desired physical, chemical and electrical characteristics and esthetic effects.

DESCRIPTION OF THE PREFERRED EMBODIMENT

The first step in the method of this invention is the formation of the organic thermosetting material into a body having a cavity or recess. Although the body can be performed by a variety of conventional methods, such as transfer molding, the thermosetting material preferably is in powder form and is compacted into a cup-like shape by conventional mechanical compaction means, such as by conventional pelleting punch presses widely used in the ceramic art. This mechanical compaction of the thermosetting material without the use of heat permits the use of partially cured or "B-stage" epoxies commonly used for the overcoating in prior art processes. The use of the same material for the preformed body as for the overcoating is particularly preferred because any build-up of internal stresses resulting from a difference in the coefficients of thermal expansion is eliminated. However, the use of the same material for both the preformed body and overcoating is not required as long as the coefficients of thermal expansions thereof reasonably approximate each other so internal stresses during thermal cycling are minimized. The densification of the thermosetting material produced by the compaction also reduces the permeability of the cured protective coating.

The thermosetting material can be formed in any of a variety of external configurations, such as hexahedral, hemispherical, cylindrical, frusto-conical and the like; the only requirement being that the preformed body have a sufficiently large cavity or recess to accommodate the electrical component and associated wiring to be protected and, preferably, that a peripheral lip be provided around the cavity for the purposes discussed hereinafter. The powdered material can be of any particle size adaptable to being compacted into the desired cup-like shape with sufficient structural integrity for the handling necessary for assembly onto the circuit substrate. Generally, when a pelleting punch press is used, a compaction pressure in the range of about 1,000 to 10,000 p.s.i. with the material at room temperature can be used to obtain adequate compaction of the powdered material.

FIGS. 1*a* through 1*d* illustrate an electrical circuit device, generally designated as 10, during various stages of assembly wherein an environmental protection is provided in accordance with this invention. It must be appreciated that the various circuit elements shown in these figures have been enlarged considerably for the purposes of illustration. In actual practice, the overall dimensions of the illustrated device may be as small as 0.1 inch × 0.1 inch × 0.05 inch.

Figure 1A:
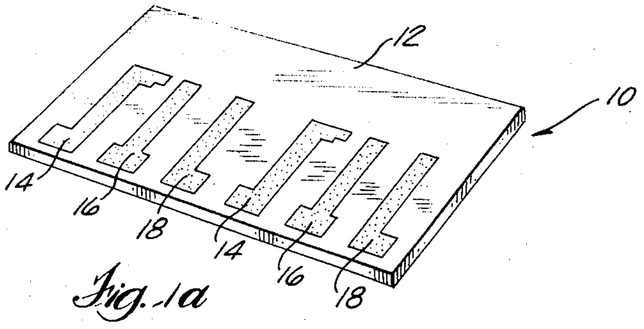
FIG. 1*a* through 1*d* are perspective views of an electrical circuit assembly at various stages of assembly in accordance with this invention.
Figure 1B:
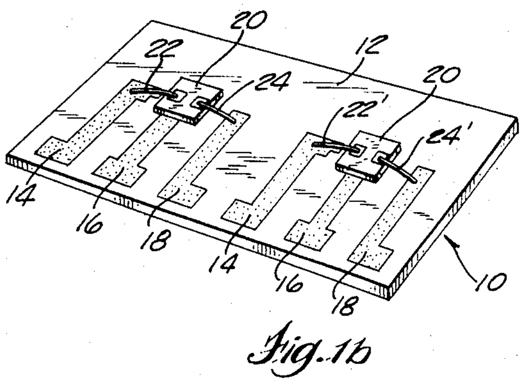

As shown in FIG. 1*a*, circuit substrate 12, made of an insulating material such as glass, alumina, beryllia, or other ceramic material, has metalized conductive paths 14, 16 and 18 applied to the surface thereof by silk screening, evaporating, plating or other suitable means. An electrical component, such as a transistor 20, is bonded to circuit substrate 12 in a conventional manner, such as by thermocompression bonding, so that the base thereof is in conductive relationship with conductive path 16, as shown in FIG. 1*b*. Thin gold wires 22 and 24 electrically connect the emitter and collector of transistor 20 to conductive paths 14 and 18, respectively. These wires are bonded to both the transistor and conductive paths by conventional techniques, such as by thermocompression or ultrasonic bonding.

Figure 1C:
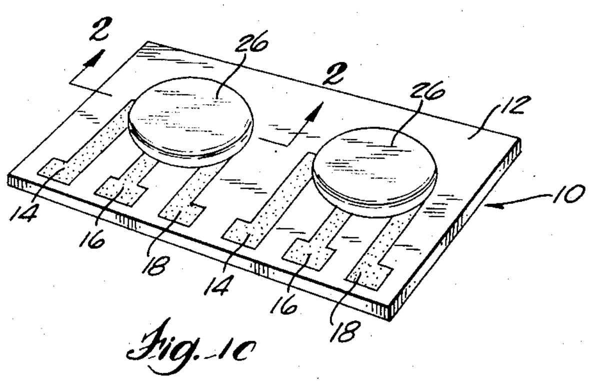
Figure 2:
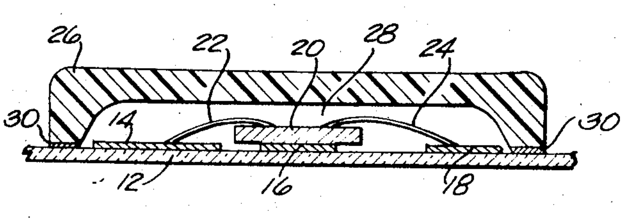
FIG. 2 is a cross sectional view taken along the plane designated by line 2—2 of FIG. 1.

An organic thermosetting material, such as bisphenol epoxy resin, which has been formed into a preformed body 26 as discussed above, is then placed over transistor 20 and wires 22 and 24 (FIG. 1*c*). In the inverted position, as shown in FIG. 2, body 26 has a sufficiently large cavity 28 to accommodate both transistor 20 and wires 22 and 24, thereby precluding any damage thereto as the body is positioned over them by conventional means, such as a vacuum pick-up device.

In order that the body 26 is maintained in place during handling, it is preferred that means be used for adhesively attaching body 26 to substrate 12, such as with a small amount of a compatible liquid epoxy adhesive applied to the peripheral lip 30. The organic thermosetting material of body 26 is preferably heated to either cure same or accelerate curing (if material is curable at room temperature); therefore, this adhesion is most preferably accomplished by preheating the circuit substrate to a temperature above the softening or tackifying temperature of body 26 but below that deleterious to transistor 20. Generally, a preheating temperature in the range of about 250° to 300° F. can be used with most of the organic thermosetting materials usable in this invention.

It has been found that the provision of a peripheral lip on the preformed body is particularly advantageous for obtaining the best protective coverage of electrical components. When the thermosetting material is formed into a flat shape without a peripheral lip, the material tends to shrink away from the substrate during curing. The peripheral lip permits an initial bonding of the preformed body at the peripheral lip and "balling" or shrinkage away from the substrate surface as the material cures is substantially eliminated.

After body 26 has been positioned over transistor 20 and wires 22 and 24, the assembly is heated to at least partially cure the thermosetting material in order to stabilize it against subsequent processing steps, e.g., material is sufficiently cured so that it does not flow when external leads are applied by dip soldering at approximately 360° F. Although FIG. 2 shows a void space between body 26 and transistor 20, this void is at least partially filled, preferably completely filled, as the thermosetting material becomes somewhat fluid during the stabilizing step and/or final curing steps. Generally, a temperature in a range of about 250° to 300° F. for approximately 5 to 10 minutes can be used to accomplish this stabilization or initial setup of the thermosetting material. If desired the preformed material can be completely cured at this time; however, for those applications where an overcoating is to be subsequently applied, completion of the curing can be effected concurrently with the curing of the protective overcoating.

From the above description, it can be appreciated that the provision of an organic thermosetting material in a preformed body in accordance with this invention permits very precise definition of the amount and location of environmental protection applied to the circuit substrate. The amount of thermosetting material and the configuration of the coating required to provide the necessary environmental protection can be accurately and easily controlled by the proper configuration of the preformed body. Since the preformed material can be adhesively attached to the substrate surface and will not flow after application, the area of application is primarily dependent upon the operator's positioning of the preformed body, not upon a multitude of variables inherent in the prior art techniques.

External leads 32 are then attached to conductive paths 14, 16 and 18. An overcoating 34 of an organic thermosetting material is then applied by conventional techniques such as spraying or brushing, but preferably by dipping the assembly (which has been preheated in an oven to between 300° and 325° F.) into a fluidized bed of an organic thermosetting material in powder form where a slowly rising air flow expands the volume of the mass of powder by suspending its particles. The suspended thermosetting material builds up a coating on the outer surfaces of the circuit substrate 12 and body 26. Generally, it takes approximately 6 seconds to build-up a 10 mil coating. As is well recognized to those skilled in the art, the temperature and time is dependent upon the particular organic thermosetting material being used. As discussed above, the material used for this overcoating is preferably the same as that used for the preformed body so that there is an exact matching of the coefficients of thermal expansion.

Figure 1D:
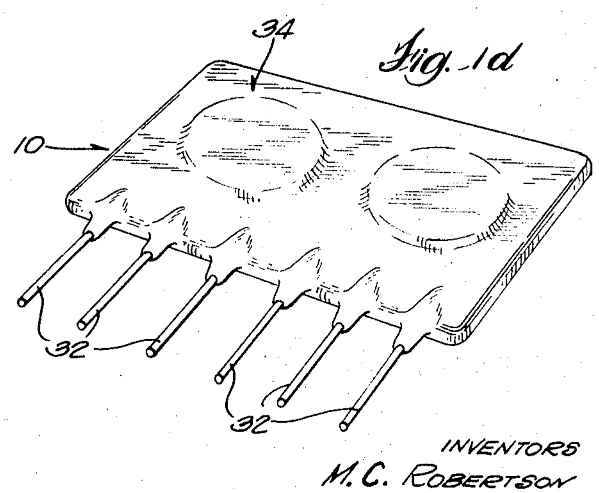

After the overcoating has been applied, the assembly is cured in an oven at about 300° to 310° F. for approximately 1.5 hours. If desired, infra-red techniques can be used to speed up the curing time. The specific time or temperature used for curing are largely dependent upon a particular thermosetting material used as is well-known to those skilled in the art. The resulting structure is shown in FIG. 1*d*.

Electrical circuit assemblies made in accordance with this invention, utilizing a powdered B-stage bisphenol epoxy resin for the preformed body and in a fluidized bed as the overcoating, have exhibited an excellent resistance to cracking during thermal cycling tests in addition to meeting other operating specification requirements, such as moisture resistance, thermal impedance, etc. Transistor units so produced were subjected to several cycles between −85° F. for 30 minutes and +300° F. for 30 minutes without any failures.

While a preferred embodiment of this invention has been described in detail, it will be obvious to those skilled in the art that the invention may be embodied otherwise without departing from its spirit and scope.

We claim:

1. A method for providing environmental protection to discrete electrical components mounted on supporting means comprising mechanically preforming an uncured organic thermosetting material into a body having a cavity sufficient to accommodate said electrical component, said body being formed separately from said supporting means; positioning said preformed body over said component so that said component is completely encased within said cavity; subjecting said preformed body to heat of that degree which is not damaging to said component, but which causes said thermosetting material to soften and to flow around said component in encompassing relationship and heating said thermosetting material preformed body for a period of time and at a temperature sufficient to at least partially cure said first thermosetting material to a semi-hardened state and to bond said thermosetting material to said supporting means.

2. The method according to claim 1 wherein said body is formed to have a peripheral lip about said cavity which is placed in contact with the surface of said supporting means.

3. The method according to claim 2 wherein said preformed body is adhesively attached to said supporting means during the positioning step.

4. The method according to claim 3 further comprising applying an overcoating of a second organic thermosetting material over the outer surfaces of said preformed body and said supporting means, said second thermosetting material having a coefficient of thermal expansion closely approximating that of said first thermosetting material, and curing both of said thermosetting materials to form a hardened protective coating.

5. The method according to claim 4 wherein said first thermosetting material is in powder form and said preformed body is formed by mechanical compaction of said powder.

6. The method according to claim 5 wherein the surface of said supporting means is heated to a predetermined temperature above the softening point of said first thermosetting material but below that deleterious to said electrical components.

7. A method for providing environmental protection an al. electrical circuit assembly having at least one discrete electrical component electrically mounted on a circuit substrate comprising mechanically preforming a first uncured organic thermosetting material into a cup-like shape, said formed cup being dimensioned to cover a predetermined portion of the surface area of said substrate, having a cavity configurated to accommodate said electrical component and having a peripheral lip around said cavity, said cup being formed from a material different than that of said substrate heating the surface of said substrate to a temperature above the softening point of said first thermosetting material but below that deleterious to said electrical component; positioning said formed cup, in the inverted position, over said electrical component so that said peripheral lip thereof contacts said heated surface and said formed cup encases said electrical component; subjecting said cup to a heat of that degree which is not damaging to said component, but which causes said first thermosetting material to soften and to flow around said component in encompassing relationship and at least partially fill any void space between said thermosetting material and said component; further heating the assembly for a time and at a temperature sufficient to at least partially cure said first thermosetting material but less than that detrimental of said electrical component; applying a final protective overcoating of a second uncured organic thermosetting material to the assembly, said second thermosetting material having a co-efficient of thermal expansion closely approximating that of said first thermosetting material; and heating the device at a time and temperature sufficient to cure said first and second materials to their hardened states and to bond said materials to said substrate.

8. The method according to claim 7 wherein said first thermosetting material is in powdered form and said cup is formed by mechanical compaction of said powder.

9. The method according to claim 8 wherein said overcoating is applied by immersing said assembly into a fluidized bed of said second thermosetting material in powder form.

10. The method according to claim 9 wherein said first and second thermosetting materials are the same material.

11. The method according to claim 10 wherein said first and second thermosetting materials comprise a bisphenol epoxy resin.

* * * * *